US006729955B2

(12) United States Patent
Bennett et al.

(10) Patent No.: US 6,729,955 B2
(45) Date of Patent: May 4, 2004

(54) GAMING MACHINE WITH PAYOUT METER AND ANIMATED PAYOUT DISPLAY

(75) Inventors: Nicholas Luke Bennett, Sydney (AU); Graeme Tooth, Sydney (AU)

(73) Assignee: Aristocrat Technologies Australia Pty Ltd., New South Wales (AU)

( * ) Notice: Subject to any disclaimer, the term of this patent is extended or adjusted under 35 U.S.C. 154(b) by 0 days.

(21) Appl. No.: 09/824,963

(22) Filed: Apr. 3, 2001

(65) Prior Publication Data

US 2002/0016201 A1 Feb. 7, 2002

(30) Foreign Application Priority Data

Apr. 3, 2000 (AU) ............................................. PQ6642

(51) Int. Cl.[7] ............................................. A63F 13/00

(52) U.S. Cl. ............................. 463/20; 463/25; 463/31; 463/35

(58) Field of Search ............................. 463/20, 25, 31, 463/35

(56) References Cited

U.S. PATENT DOCUMENTS 6,358,147 B1 * 3/2002 Jaffe et al. .................... 463/20

* cited by examiner

*Primary Examiner*—Jessica Harrison
*Assistant Examiner*—Corbett B Coburn
(74) *Attorney, Agent, or Firm*—Katten Muchin Zavis Rosenman

(57) ABSTRACT

A gaming machine has a display and a game controller arranged to control images displayed on the display. The game controller is arranged to play a game wherein one or more random events are caused to be displayed on the display means and, if a predefined winning event results, the machine awards a prize which is displayed on a meter showing the paying of the prize. Upon the occurrence of a winning event, the controller causes, in addition to incrementing the meter, an award indicating sequence to be generated. The award indicating sequence generates, in a discernible format, outputs relating to payment of the prize to be paid as a result of the winning event. The outputs change during payment of the prize with a rate of change being dependent on, and varying with, a size of the prize.

9 Claims, 9 Drawing Sheets

GAMING MACHINE WITH PAYOUT METER AND ANIMATED PAYOUT DISPLAY

FIELD OF THE INVENTION

This invention relates to a gaming machine. More particularly, the invention relates to a gaming machine and to an improvement in features of such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players. Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and ancillary arrangements which are popular with the players as a mechanism for improving sales, retaining customers, attracting new customers and to ensure that customers continue playing the gaming machines of that particular venue.

SUMMARY OF THE INVENTION

According to the invention, there is provided a gaming machine having a display means and a game control means arranged to control images displayed on the display means, the game control means being arranged to play a game wherein one or more random events are caused to be displayed on the display means and, if a predefined winning event results, the machine awards a prize which is displayed on a meter showing the paying of the prize, the gaming machine being characterized in that, upon the occurrence of a winning event, the control means causes, in addition to incrementing the meter, an award indicating sequence to be generated, the award indicating sequence generating, in a discernible format, outputs relating to payment of the prize to be paid as a result of the winning event, the outputs changing during payment of the prize with a rate of change being dependent on, and varying with, a size of the prize.

The outputs may include a visual output as well as an audible output. A type and volume of the audible output which is emitted may vary depending on the rate at which a payout is made, the size of the win, or as a result of some other input.

The visual output may be a screen animation which is represented in a graphical format. At least one feature of the animation, as well as the audio output, may vary during payment of the win.

By "graphical format" is meant that an image is displayed which indicates in a manner, other than incrementing digits, the prize paid to the player as a result of the win and may be provided in addition to a conventional win meter of the gaming machine.

The feature of the animation which varies may, for example, be a position of an indicator of the animation and/or a size of the animation.

In one embodiment, the animation may occur on a screen of a base game. The base game may be a spinning reel game having a plurality of reel strips, the animation occurring on at least one of the reel strips in respect of at least one special symbol carried by said at least one reel strip. Preferably, the, or each, symbol is a special symbol such that when a plurality of them are displayed together, they trigger the award indicating sequence.

In another embodiment, the animation may occur as a second screen feature.

The award indicating sequence may be initiated by way of an interactive display. The screen of the gaming machine may thus be a touch screen. Upon a winning condition occurring, a particular representation may be displayed. The player may then touch the screen over such representation to cause activation of the award indicating sequence being an animation of the representation.

The meter may be an incrementing digit win meter which is incremented contemporaneously with the award indicating sequence while the award indicating sequence is occurring.

BRIEF DESCRIPTION OF THE DRAWINGS

The invention is now described by way of example with reference to the accompanying drawings in which.

DETAILED DESCRIPTION OF THE DRAWINGS

Figure 1:
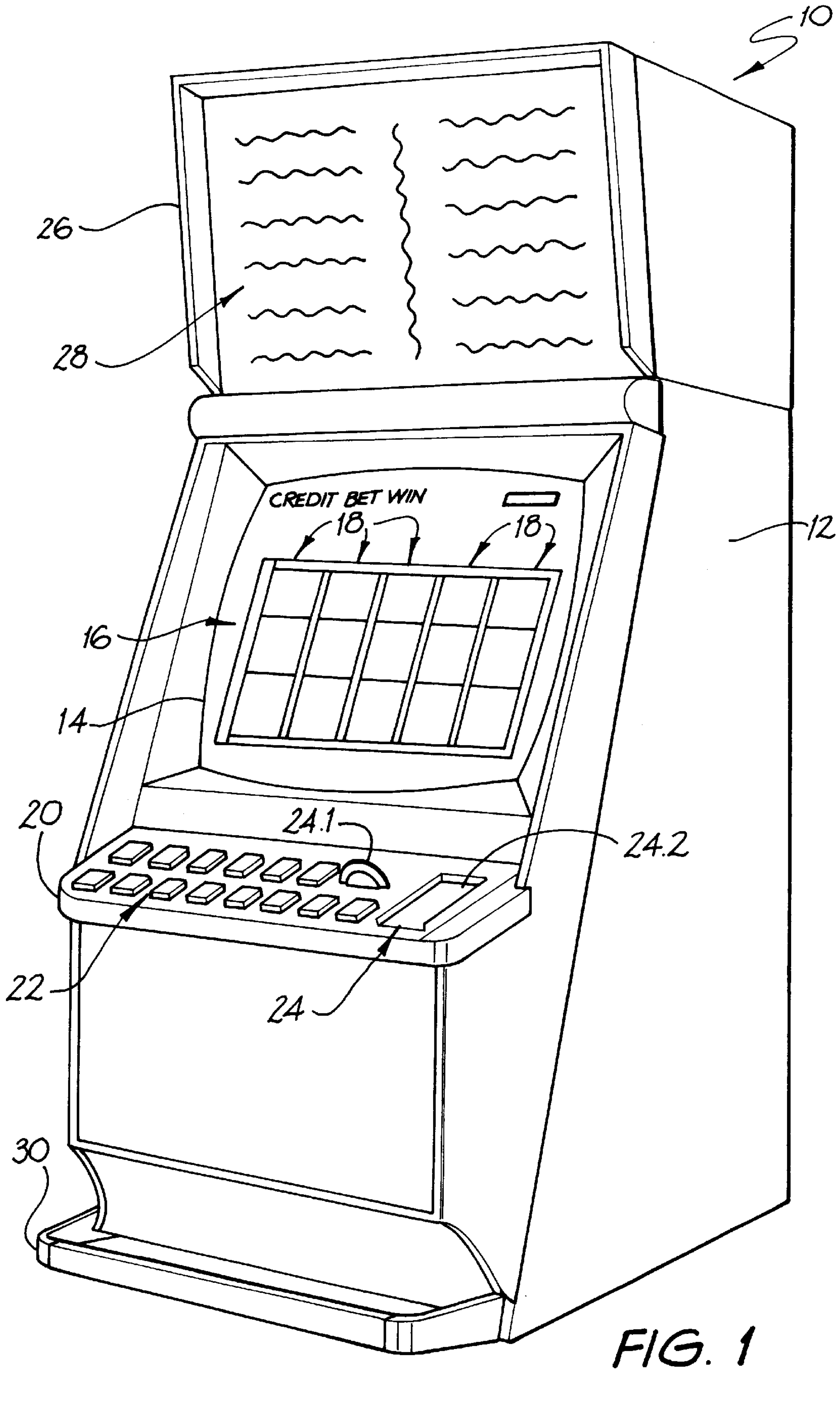
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
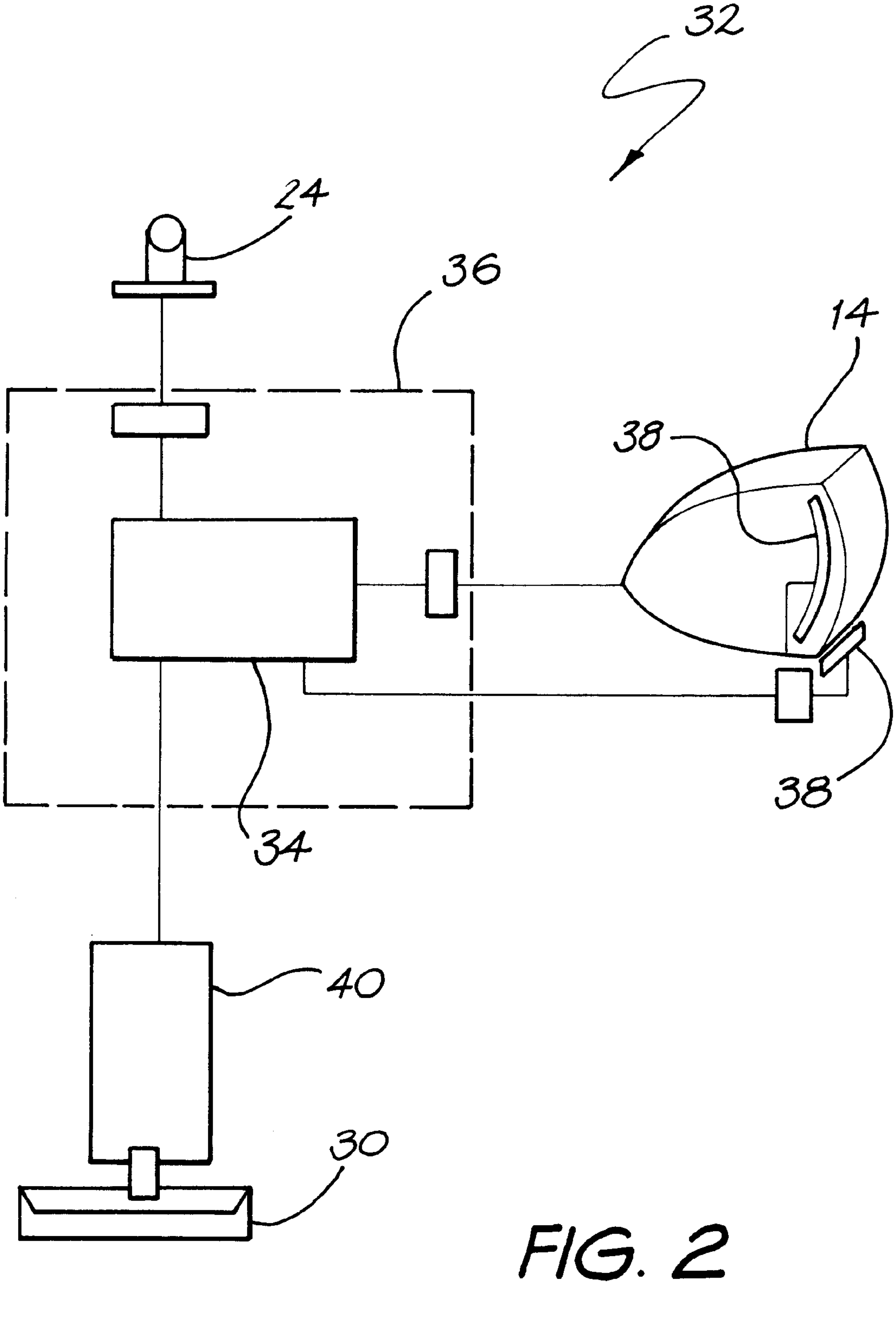
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

While the embodiment of the game to be described generally relates to spinning reel games, it will be appreciated that the embodiment is, and other, similar embodiments are, equally applicable to other types of games played on the machines such as card games like poker or ball games like Keno or the like.

In use, a game played on the machine lo commences in a conventional fashion. Once a player has established sufficient credit to begin playing, for example, by the input of money, tokens, or the like, the player presses the relevant button of the bank 22 of buttons to commence "spinning" of the reels 18. The reels 18 are video simulations of spinning reels. If, once the reels have stopped spinning a winning combination of symbols results, a feature, being an award indicating sequence, commences.

In the embodiment shown in FIGS. 3*a* to 3*e*, the image on the screen of the video display unit 14 changes from the spinning reels 18 to a representation of a rev counter or tachometer 42. A message 44 appears on the screen of the video display unit 14 requesting the player to start the feature. The player touches the screen on the message 44 or, instead, a separate button of the bank 22 of buttons of the machine 10. Once the feature has been started, a needle 46 of the tachometer 42 commences a clockwise movement. The rate at which the needle moves increases depending on the size of the prize and this is accompanied by sound effects increasing in volume and, optionally, graphical effects. In addition, a win meter 48 of the gaming machine 10, as displayed on the screen of the video display unit 14, increases. For example, for a particular win, the rate at which the win meter 48 is incremented is 5×one unit increments per second for the first three seconds; 10×one unit increments per second for the next five seconds; 25×one unit increments per second for the next ten seconds; 50×one unit increments per second for the next eight seconds; 100×one unit increments per second for the next ten seconds; and 100×five unit increments per second for the next fifteen seconds.

Once the needle 46 of the tachometer has reached peak displacement, the needle 46 starts moving counter-clockwise accompanied by sound effects decreasing in volume, various other graphical effects and a decreasing rate of win meter increment. When the needle 46 is moving counter-clockwise, the win meter 48 increments at the rate of, for example, 100×one unit increments per second for five seconds; 50×one unit increments per second for the next four seconds; and lo x one unit increments per second for the next two seconds followed by zero increments.

Figure 3A:
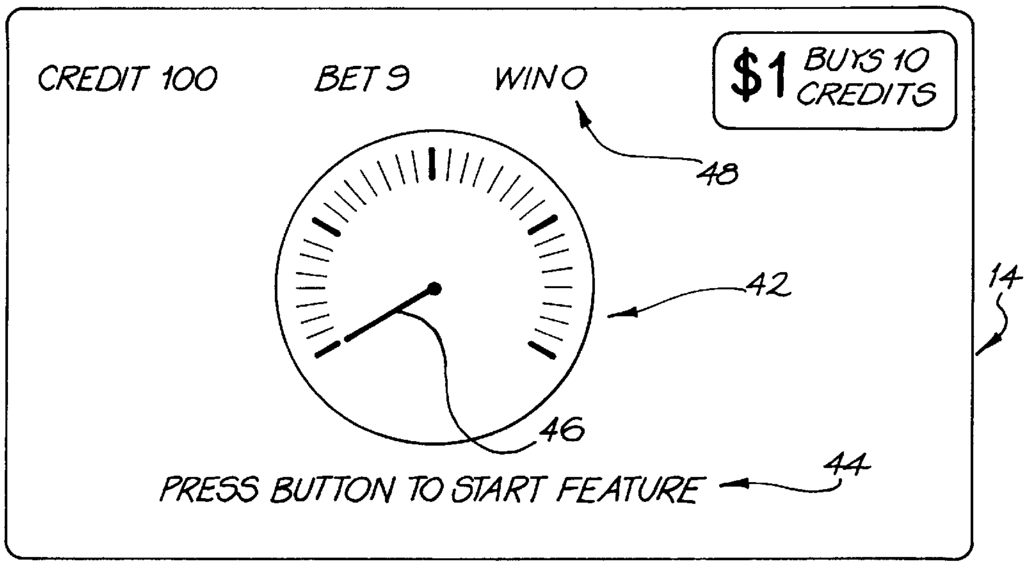
FIGS. 3*a* to 3*e* show a screen display of a first embodiment of an award indicating sequence the game in accordance with the invention.
Figure 3B:
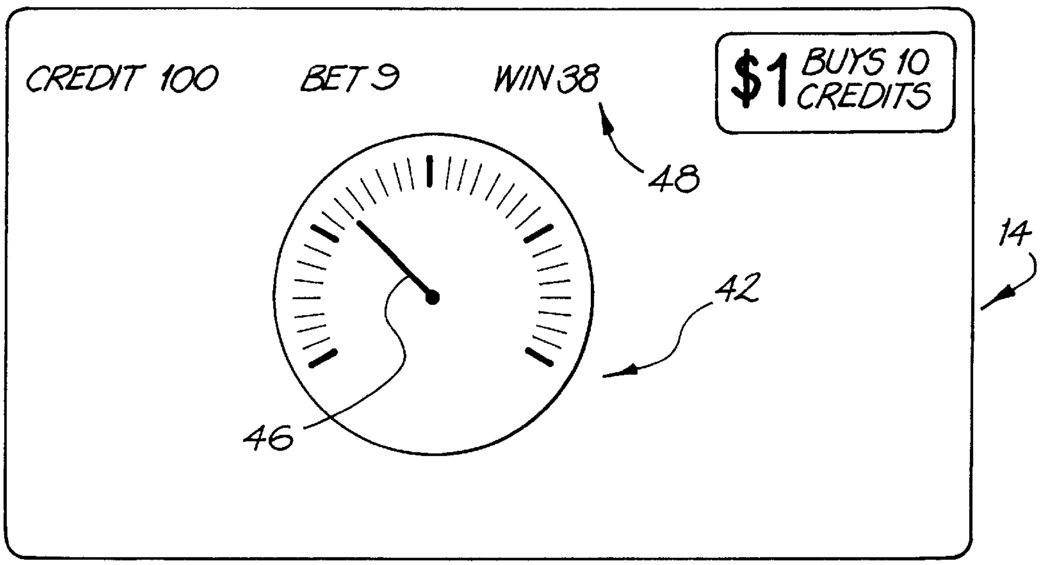
Figure 3C:
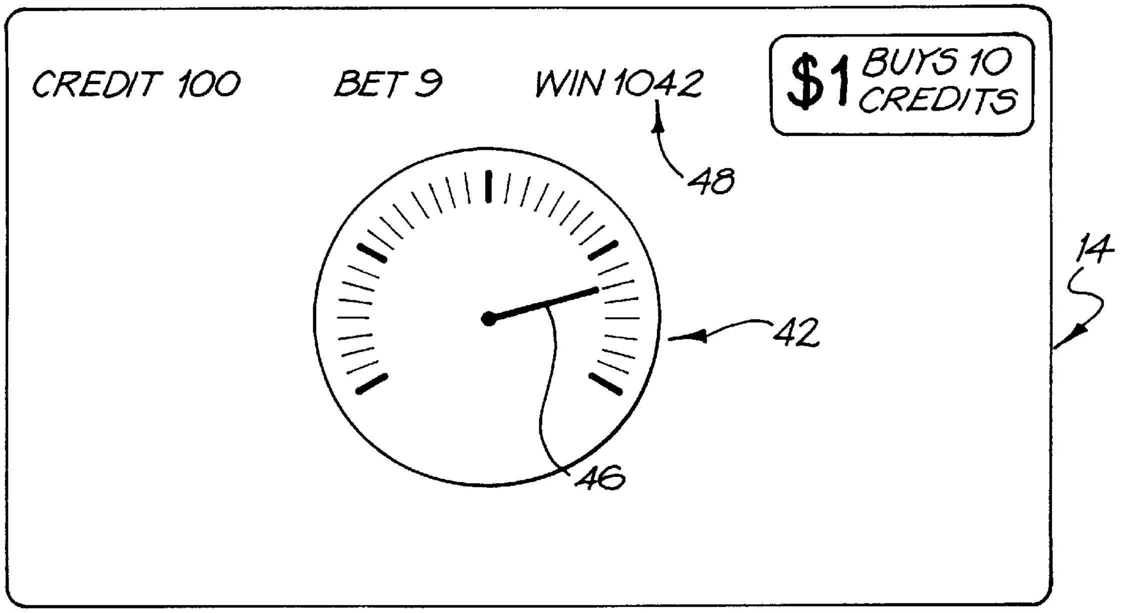
Figure 3D:
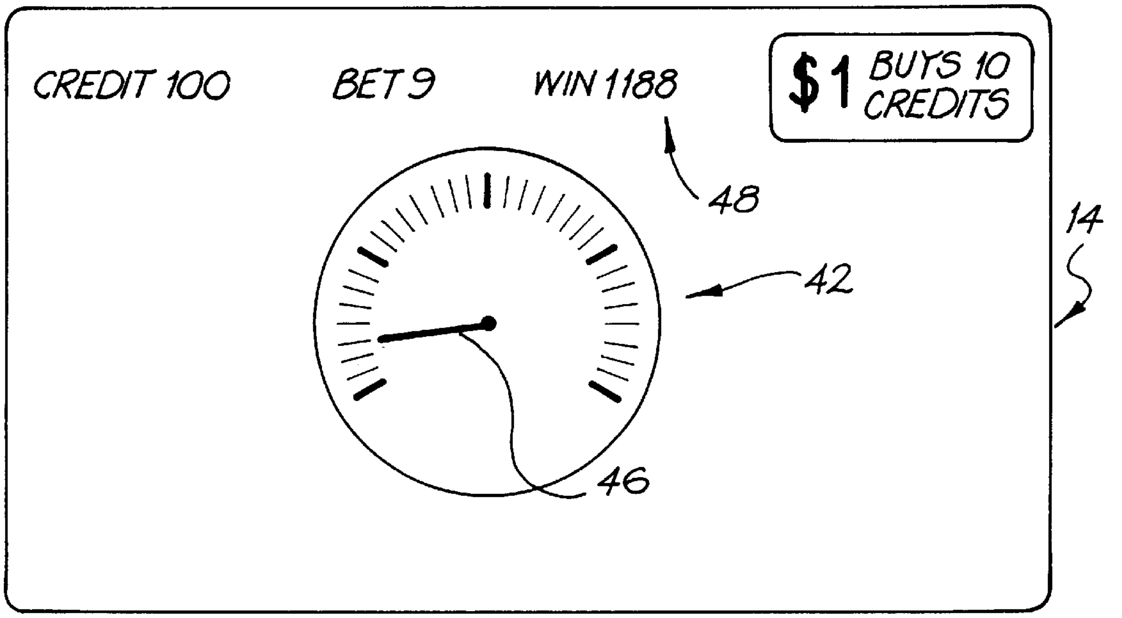
Figure 3E:
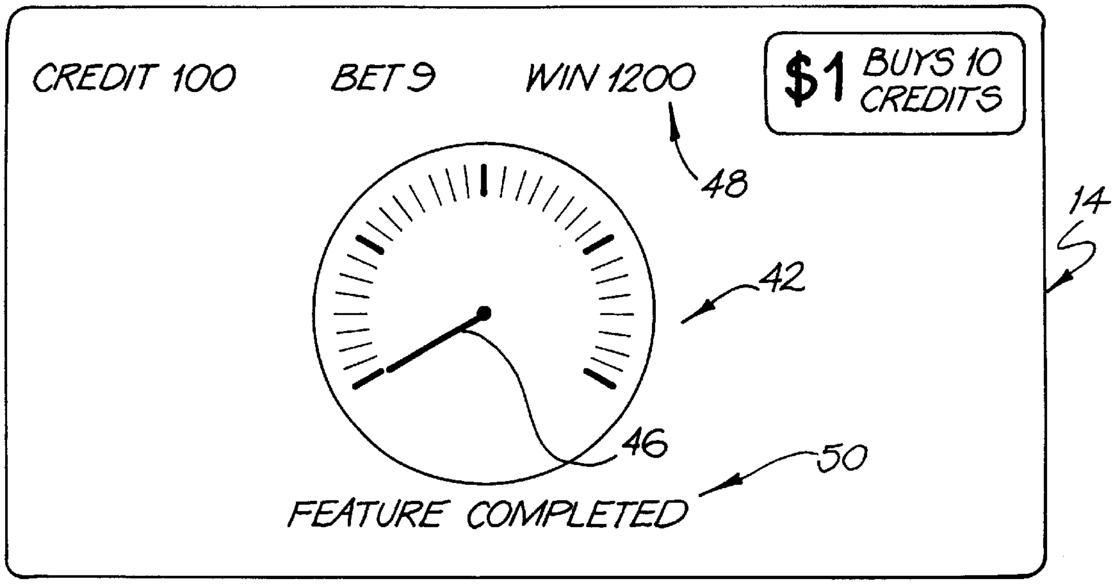

Finally, when the needle 46 of the rev-counter 42 reaches its rest position, as shown in FIG. 3*e* of the drawings, a "Feature Completed" message 50 appears on the screen of the video display unit 14.

Referring now to FIGS. 4*a* to 4*f* of the drawings, another embodiment of the invention is illustrated. With reference to FIGS. 3*a* to 3*e* of the drawings, like reference numerals refer to like parts, unless otherwise specified.

Figure 4A:
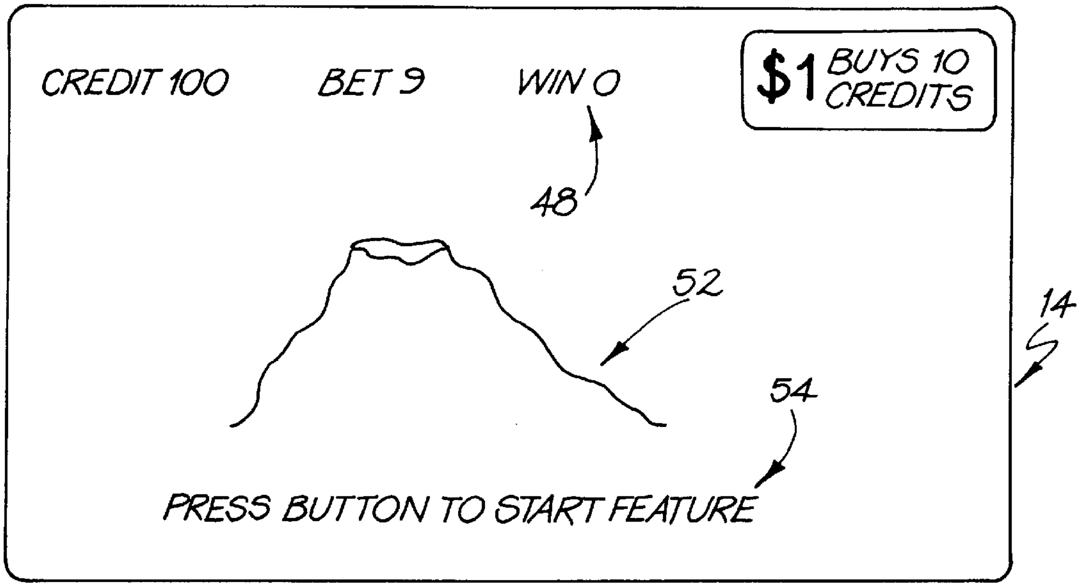
FIGS. 4*a* to 4*f* show a screen display of a second embodiment of an award indicating sequence of the game in accordance with the invention.
Figure 4B:
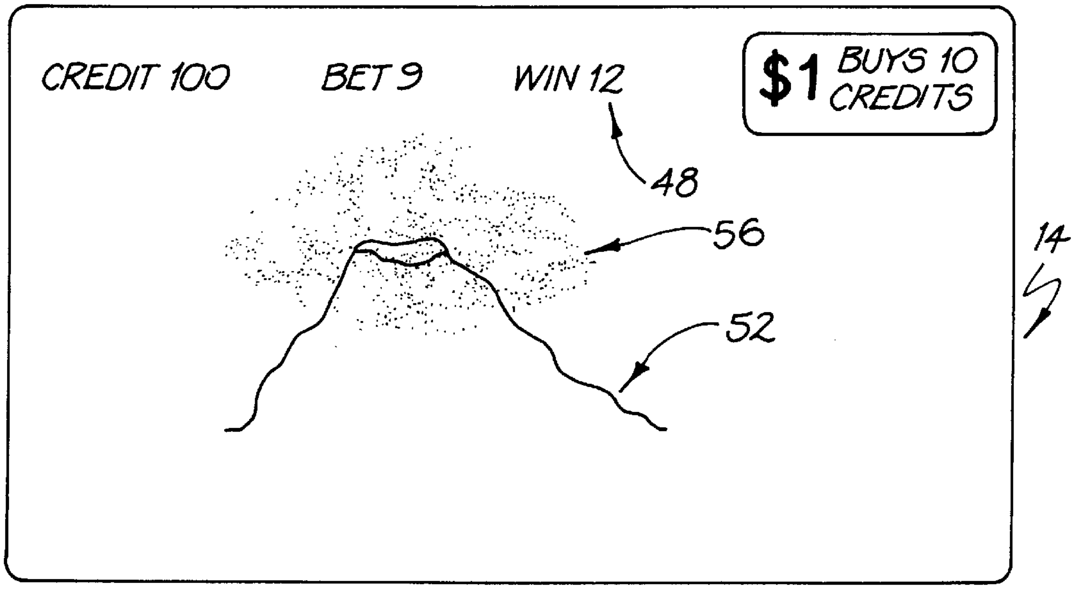

As is the case in respect of the embodiment of the invention described with reference to FIGS. 3*a* to 3*e* of the drawings, once a base game has been completed and a prize is to be awarded, an image displayed on the screen changes. In this embodiment, the image on the screen of the video display unit 14 changes from the spinning reels 18 to a representation of a volcano 52. Initially, the volcano 52 is in a quiescent state as shown in FIG. 4*a* of the drawings. Once the player has pressed the message 54 on the touch screen of the video display unit 14, "pressure" starts building in the volcano and an ash cloud 56 erupts from the volcano 52 with the accompanying audible outputs. The win meter 48 increments slowly.

Figure 4C:
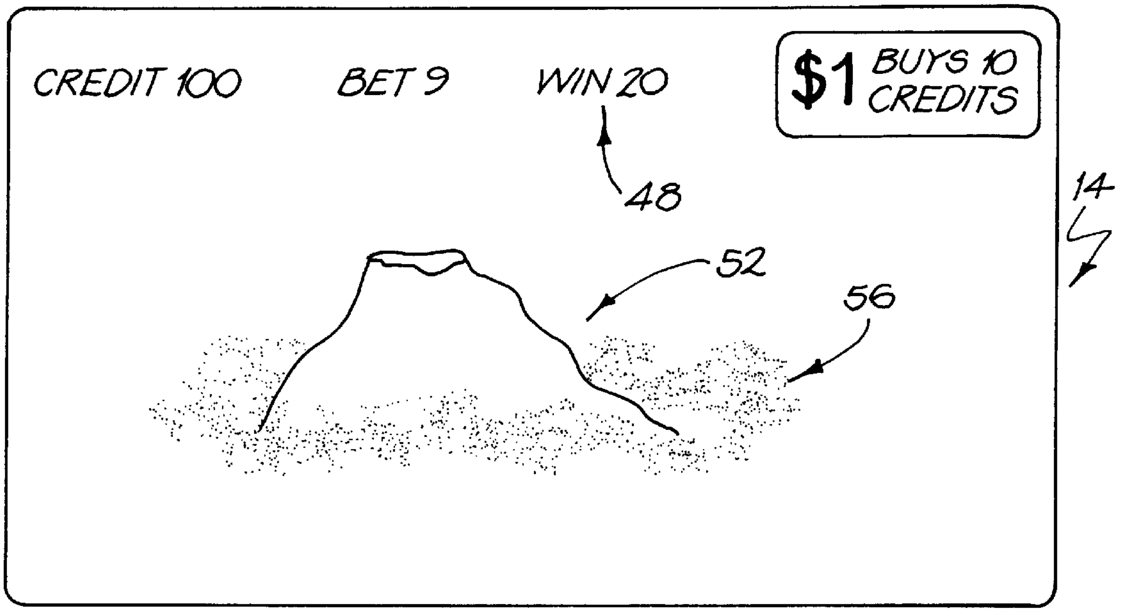
Figure 4D:
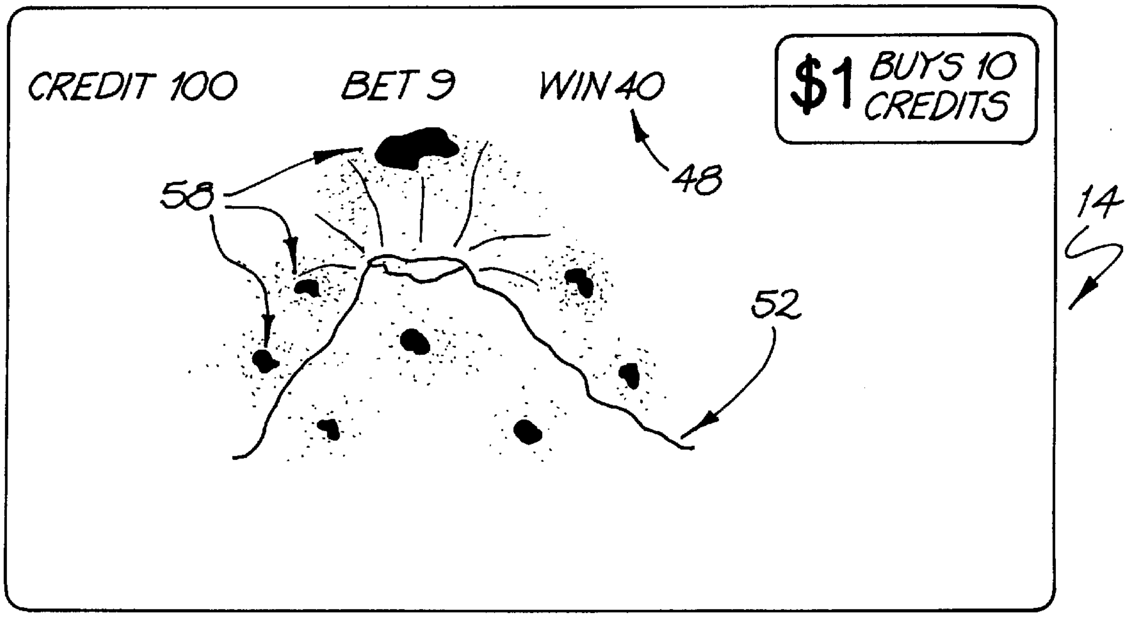

Then, as shown in FIG. 4*c* of the drawings, the ash cloud 56 subsides. At this stage, the win meter is still slowly incrementing.

In the next stage of the animation (FIG. 4*d*), boulders and lava 58 explode out of the volcano 52 and large amounts of credit are credited at once to the win meter 48, one after the other as the boulders 58 explode out of the top of the volcano 52. Once again, this stage of animation is accompanied by the appropriate audible outputs.

Figure 4E:
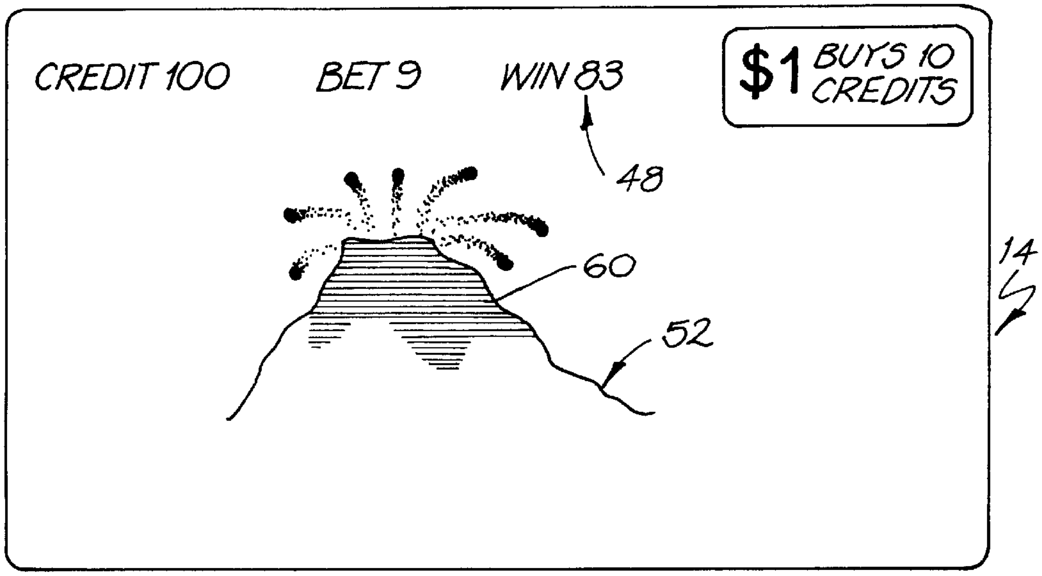
Figure 4F:
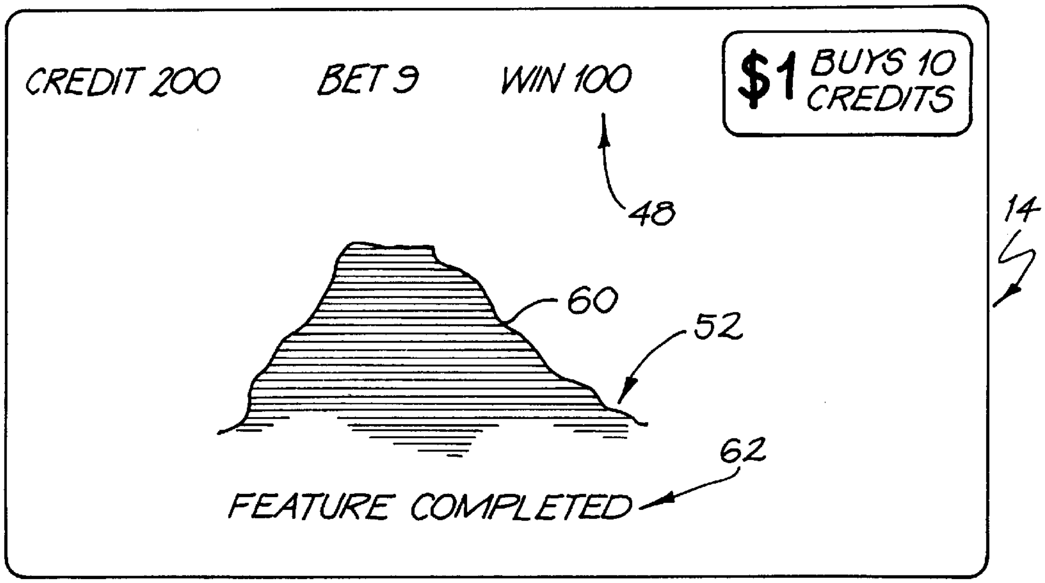
Figure 5:
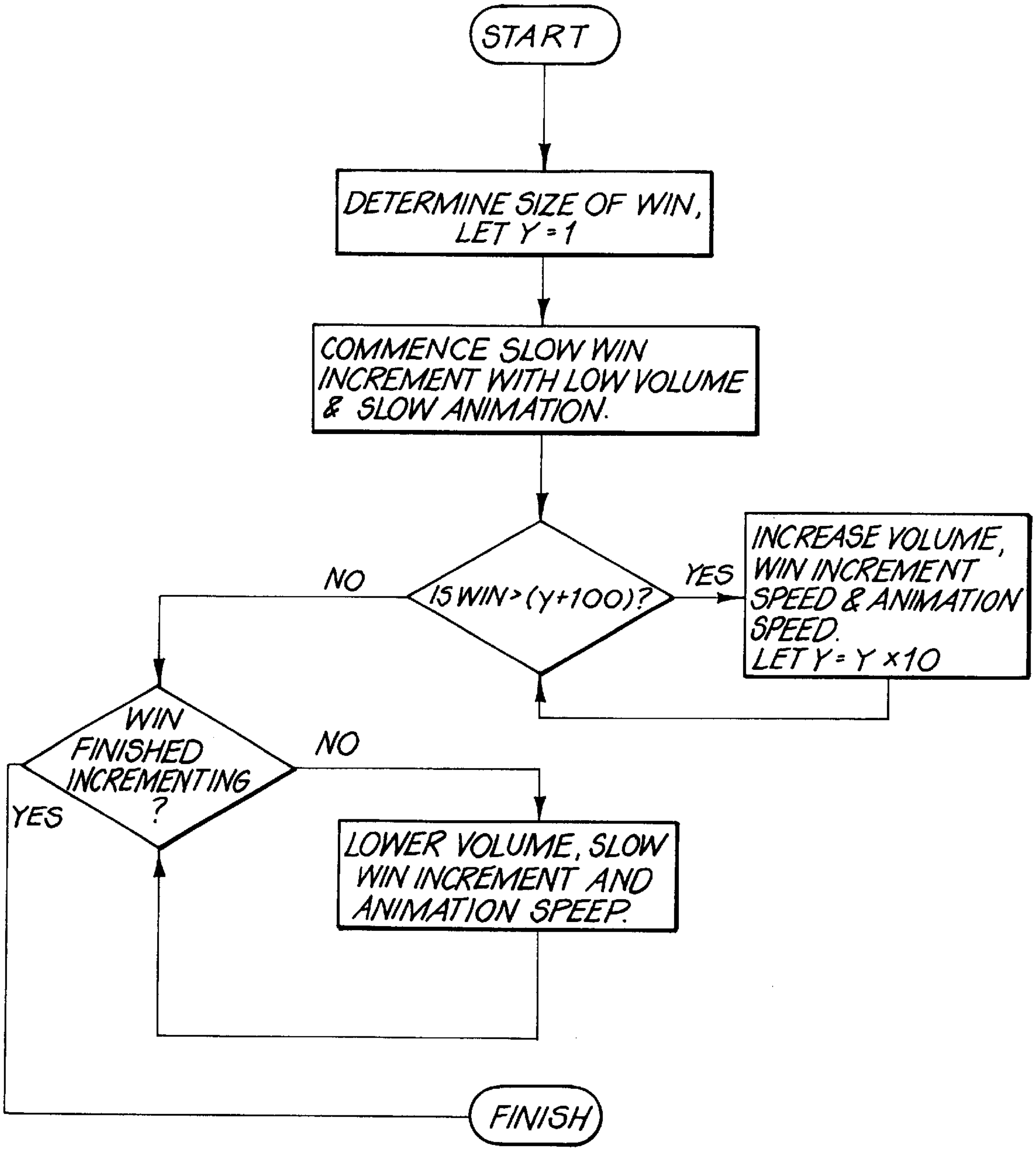
FIG. 5 shows a flow chart of the embodiment of the invention illustrated in FIGS. 3*a* to 3*e*.

In the next stage of the animation, as shown in FIG. 4*e* of the drawings, a lava stream 60 begins to flow down the sides of the volcano and this is accompanied by a consistent rate of incrementing of the win meter 48. As the lava stream 60 begins to slow the rate at which the win meter increments also slows down. These stages are, once again, accompanied by appropriate audible outputs. When the lava stream 60 reaches the foot of the volcano, as shown in FIG. 4*f* of the drawings, a "Feature Completed" message 62 is displayed on the screen of the video display unit 14 and the feature is completed.

It will be appreciated that, instead of a second screen display, the award indicating sequence could occur on the screen display of the base game. For example, when a trigger condition, such as three volcano symbols being displayed together, occurs, the volcano symbols themselves may undergo the animation. To commence the animation of each symbol, each symbol must be touched by the player in turn. It will also be appreciated that the rev-counter embodiment as described above could be implemented in a similar way on the screen display of the base game.

Hence, it is an advantage of the invention, that a game feature is provided which, the applicant believes, will encourage player interest and will provide entertainment in the playing of the games.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A gaming machine having a display means and a game control means arranged to control images displayed on the display means, the game control means being arranged to play a game wherein one or more random events are caused to be displayed on the display means and, if a predefined winning event results, the machine awards a prize which is displayed on a win meter wherein upon the occurrence of a prize winning event, the control means causes, in addition to incrementing the meter, an award indicating sequence to be generated, the award indicating sequence generating, in a discernible format, outputs relating to payment of the prize the outputs changing in a non-uniform manner during payment of the prize with a rate of change being dependent on, and varying wily a size of the prize and the meter being an incrementing digit win meter that is incremented at a rate corresponding to the rate of change of the award indicating sequence.

2. The gaming machine of claim 1 in which the outputs include a visual output as well as an audible output.

3. The gaming machine of claim 2 in which a type and volume of the audible output which is emitted varies depending on the rate at which a payout is made.

4. The gaming machine of claim 2 in which the visual output is a screen animation which is represented in a graphical format.

5. The gaming machine of claim 4 in which at least one feature of the animation, as well as the audio output varies during payment of the win.

6. The gaming machine of claim 4 in which the animation occurs on a screen of a base game.

7. The gaming machine of claim 6 in which the base game is a spinning reel game having a plurality of reel strips, the animation occurring on at least one of the red strips in respect of at least one special symbol carried by said at least one reel strip.

8. The gaming machine of claim 4 in which the animation occurs as a second screen feature.

9. The gaming machine of claim 1 in which the award indicating sequence is initiated by way of an interactive display.

* * * * *